United States Patent
Shah et al.

(10) Patent No.: US 11,076,180 B2
(45) Date of Patent: Jul. 27, 2021

(54) CONCURRENT MEDIA STREAM AGGREGATE FINGERPRINTING

(71) Applicant: Focus IP Inc., Boise, ID (US)

(72) Inventors: Faisal Shah, Boise, ID (US); David Montz, Boise, ID (US)

(73) Assignee: Focus IP Inc., Boise, ID (US)

( * ) Notice: Subject to any disclaimer, the term of this patent is extended or adjusted under 35 U.S.C. 154(b) by 0 days.

(21) Appl. No.: 16/375,727

(22) Filed: Apr. 4, 2019

(65) Prior Publication Data

US 2020/0322658 A1   Oct. 8, 2020

(51) Int. Cl.
| | |
|---|---|
| *H04N 21/2389* | (2011.01) |
| *H04N 21/234* | (2011.01) |
| *H04N 21/858* | (2011.01) |
| *H04N 21/2187* | (2011.01) |
| *H04N 21/233* | (2011.01) |

(52) U.S. Cl.
CPC ... *H04N 21/23892* (2013.01); *H04N 21/2187* (2013.01); *H04N 21/233* (2013.01); *H04N 21/23418* (2013.01); *H04N 21/8586* (2013.01)

(58) Field of Classification Search
CPC ......... H04N 21/23892; H04N 21/2187; H04N 21/233; H04N 21/23418; H04N 21/8586
See application file for complete search history.

(56) References Cited

U.S. PATENT DOCUMENTS

| | | | | |
|---|---|---|---|---|
| 8,611,422 B1* | 12/2013 | Yagnik | ............... | G06K 9/00744 375/240.16 |
| 9,876,798 B1* | 1/2018 | Lewis | ................... | H04L 63/102 |
| 2005/0154680 A1* | 7/2005 | Schmelzer | .............. | G06F 21/10 705/67 |
| 2009/0070797 A1* | 3/2009 | Ramaswamy | .......... | H04L 12/66 725/10 |
| 2013/0160038 A1* | 6/2013 | Slaney | ............... | H04N 21/8352 725/14 |
| 2017/0155933 A1* | 6/2017 | Del Strother | ...... | H04N 21/8358 |
| 2018/0191757 A1* | 7/2018 | Epstein | ................... | H04L 43/08 |

* cited by examiner

*Primary Examiner* — Sumaiya A Chowdhury
(74) *Attorney, Agent, or Firm* — Adsero IP

(57) ABSTRACT

Novel tools and techniques for concurrent media stream aggregate fingerprinting are provided. A system includes a harvester subsystem, downloader subsystem, fingerprinter subsystem, and an analyzer subsystem. The harvester subsystem is configured to identify a first address associated with a first third-party streaming platform based on stream search criteria. The downloader subsystem is configured to capture a first streaming media segment from the first address. The fingerprinter subsystem is configured to generate a first captured stream fingerprint of the first streaming media segment and generate a first source fingerprint of a source streaming media segment. The analyzer subsystem may be configured to determine a first similarity value between the first source fingerprint and the first captured stream fingerprint, and determine, based at least in part on the first similarity value, whether the first third-party streaming platform includes unauthorized streaming media content that matches source streaming media content.

18 Claims, 7 Drawing Sheets

CONCURRENT MEDIA STREAM AGGREGATE FINGERPRINTING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to streaming media content controls, and more particularly to a media stream fingerprinting scheme.

BACKGROUND

As live media streaming expands as a popular form of media broadcast and distribution, methods of pirating and/or streaming unauthorized content have increased correspondingly. Websites and other platforms used to stream and/or otherwise broadcast unauthorized content often rely on an original, authorized media stream for source material, typically in the form of a uniform resource locator (URL). Typically, unauthorized streams may be hosted or otherwise made available for access by multiple parties on multiple websites and/or platforms. Thus, conventional techniques for combating the unauthorized streaming of media content rely on human action and intervention to report and/or otherwise identify unauthorized streams.

Accordingly, tools and techniques for are provided for an automated method of identifying multiple, concurrent media content streams in the aggregate.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
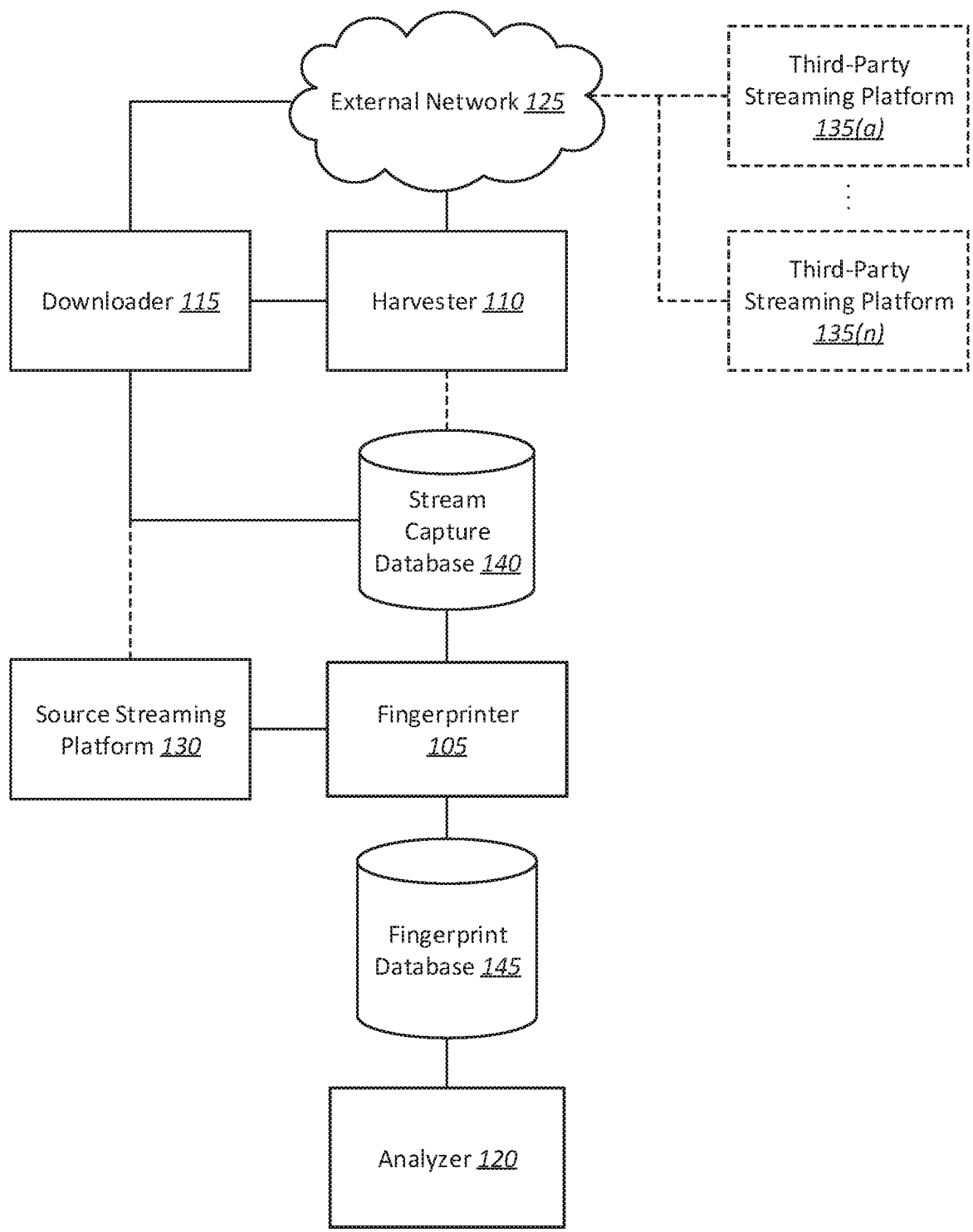
FIG. 1 is a schematic block diagram of a fingerprinting system for concurrent media stream aggregate fingerprinting, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for concurrent media stream aggregate fingerprinting is provided. The system may include a harvester subsystem, downloader subsystem, fingerprinter subsystem, and an analyzer subsystem. The harvester subsystem may be configured to identify a first address associated with a first third-party streaming platform based on stream search criteria. The downloader subsystem may be configured to capture a first streaming media segment from the first address. The fingerprinter subsystem may be configured to generate a first captured stream fingerprint of the first streaming media segment, the first captured stream fingerprint uniquely associated with the first streaming media segment and generate a first source fingerprint of a source streaming media segment. The analyzer subsystem may comprise a processor, and a non-transitory computer readable medium comprising instructions executable by the processor to obtain, from the fingerprint subsystem, the first source fingerprint and first captured stream fingerprint. The instructions may be further executable to determine a first similarity value between the first source fingerprint and the first captured stream fingerprint, and determine, based at least in part on the first similarity value, whether the first third-party streaming platform includes unauthorized streaming media content. The unauthorized streaming media content may include the first streaming media segment, that matches source streaming media content, and the source streaming media content may include the source streaming media segment. The instructions may further be executable to perform a remedial action based on the determination that the first third-party streaming platform includes unauthorized streaming media content.

In another aspect, an apparatus for concurrent media stream aggregate fingerprinting is provided. The apparatus may include a processor, and non-transitory computer readable media comprising instructions executable by the processor to perform various functions. In various embodiments, the instructions may be executable to obtain, from a fingerprint subsystem, a first source fingerprint of a first source streaming media segment, and a first captured stream fingerprint of a first streaming media segment associated with a first third-party streaming platform. The instructions may be executable to determine a first similarity value between the first source fingerprint and the first captured stream fingerprint, and determine, based at least in part on the first similarity value, whether the first third-party streaming platform includes unauthorized streaming media content, wherein the unauthorized streaming media content includes the first streaming media segment, that matches source streaming media content, wherein the source streaming media content includes the source streaming media segment. The instructions may further be executable to perform a remedial action based on the determination that the first third-party streaming platform includes unauthorized streaming media content.

In a further aspect, a method for concurrent media stream aggregate fingerprinting is provided. The method includes identifying, via a harvester subsystem, a first address associated with a first third-party streaming platform based on stream search criteria, capturing, via a downloader subsystem, a first streaming media segment from the first address, generating, via a fingerprinter subsystem, a first captured stream fingerprint of the first streaming media segment, the first captured stream fingerprint uniquely associated with the first streaming media segment, and generating, via the fingerprinter subsystem, a first source fingerprint of a source streaming media segment. The method may continue by comparing, via an analyzer subsystem, the first source fingerprint and the first captured stream fingerprint. The method may further include determining, via the analyzer subsystem, a first similarity value indicative of a similarity between the first source fingerprint and the first captured stream fingerprint. The method may continue by determining, via the analyzer subsystem, based at least in part on the first similarity value, whether the first third-party streaming platform includes unauthorized streaming media content, wherein the unauthorized streaming media content includes the first streaming media segment, that matches source streaming media content, wherein the source streaming media content includes the source streaming media segment.

Various modifications and additions can be made to the embodiments discussed without departing from the scope of the invention. For example, while the embodiments described above refer to specific features, the scope of this invention also includes embodiments having different combination of features and embodiments that do not include all the above described features.

FIG. 1 is a schematic block diagram of a fingerprinting system 100 for concurrent media stream aggregate fingerprinting, in accordance with various embodiments. The system 100 includes a fingerprinter 105, harvester 110, downloader 115, analyzer 120, external network 125, source stream platform 130, one or more third party platforms 135(a)-135(n) (collectively "third-party streaming platforms 135"), stream capture database 140, and fingerprint database 145. It should be noted that the various components of the system 100 are schematically illustrated in FIG. 1, and that modifications to the system 100 may be possible in accordance with various embodiments.

In various embodiments, the fingerprinter 105 may be coupled to a stream capture database 140, source stream platform 130, and fingerprint database 145. The harvester 110, may in turn be coupled to one or more third-party streaming platforms 135(a)-135(n) (collectively "third-party streaming platforms 135") via an external network 125. The harvester 110 may further be coupled to a downloader 115, and optionally, in some embodiments, to the stream capture database 140. The downloader 115, similarly, may be coupled to one or more third-party streaming platforms 135(a)-135(n) via the external network 125, and the stream capture database 140. The analyzer 120 may be coupled to the fingerprint database 145.

In various embodiments, the system 100 may be configured to identify one or more unauthorized media streams hosted or otherwise made available (publicly or otherwise) on third-party streaming platforms 135. Unauthorized media streams may include, without limitation, any streaming media content, including streaming video, audio, images, text-based information (e.g., play-by-play information, commentary, transcripts, and captioning), or any combination of the above. In some embodiments, the media stream may be a live media stream (e.g., a media stream of a live event). Live events may include, without limitation, a sporting event, concert, movie, television show, seminars, lectures, and other live, broadcast events.

The authorized media stream may be a licensed or otherwise exclusive source for viewing and/or listening to a particular live event. In contrast, an unauthorized media stream may be a media stream that is provided in an unauthorized manner, for example, without a license to distribute media streams of the live event. The unauthorized media stream may, for example, include, without limitation, an unauthorized link to the source media stream, reproduction and/or rebroadcast of the source media stream, an unauthorized capture of the source media stream that is subsequently streamed, etc. Thus, the unauthorized distribution of live media streams presents a uniquely challenging environment in which to identify the unauthorized distribution of media content and implement various digital rights management (DRM) schemes.

As will be appreciated by those skilled in the art, a source live media stream may be provided in real-time (or substantially in real-time) concurrent with the live event, minus processing time (e.g., recording and encoding), and transmission times for the media content. To make live media streams more immediately available for playback on client devices, live media streams are typically made available (e.g., pushed) in multiple streaming media segments. For example, streaming media segments may range from 0-10 seconds in length of content per segment (e.g., 2-second segments, 3-second segments, 5-second segments, etc.), or in some embodiments, greater than 10 seconds of content per segment. For example, a source live media stream may, in some embodiments, be encoded in multiple qualities (e.g., multiple bitrate streams for audio, video, or both), in multiple languages, and with corresponding metadata (e.g., captioning data). Therefore, any combination of the multiple types of source live media streams may be hosted or otherwise provided in an unauthorized manner on one or more different third-party platforms 135(a)-135(n). Moreover, streaming media segments for live media (e.g., live streaming media segments) are typically not stored for extended periods of time and deleted after a certain amount of time has elapsed.

Accordingly, in various embodiments, the harvester 110 may be configured to identify one or more third-party streaming platforms 135(a)-135(n) on which an unauthorized live media stream may be hosted or otherwise provided. The harvester 110 may be implemented in hardware, software, or both hardware and software. In some embodiments, the harvester 110 may include a software agent executable on one or more computer systems, such as a server computer. In some further embodiments, the harvester 110 may be implemented on, without limitation, one or more desktop computer systems, server computers, dedicated custom hardware appliances, programmable logic controllers, single board computers, field programmable gate arrays (FPGA), application specific integrated circuits (ASIC), or a system on a chip (SoC).

In various embodiments, a user of the harvester 110 may provide the harvester 110 with a search query or other criteria to search for unauthorized streams. For example, a harvester 110 may be provided with keywords regarding streaming media content, such as a live event to be (or currently being) live streamed. Stream search criteria for a sporting event may include, without limitation, keywords such as team names, dates, locations, scores, player names, and other information related to the sporting event. Keywords for movies or television shows may include titles, actors and actresses, directors, a plot synopsis, or other information useful for identifying the movie and/or television show. Keywords for concerts or other live events may include performer names, song names, album names, band names, tour names, locations, associated acts, and other information useful for identifying the desired live event. Accordingly, in some embodiments, the harvester 110 may include a web crawler and/or indexer configured to identify one or more third-party streaming platforms 135(a)-135(n) based on the search criteria. In some embodiments, the harvester 110 may further be configured to store the identified one or more third-party streaming platforms 135(a)-135(n).

In further embodiments, the harvester 110 may further be configured to identify streaming resources hosted on and/or provided by the third-party streaming platform 135(a)-135(n). For example, streaming resources may include, without limitation, media content, or links to media content. For example, streaming resources may include the streaming media content itself, such as one more streaming media segments or a media file, or a streaming media object (e.g., a javascript or web object to which media content may be pushed), streaming media buffers. Alternatively, streaming resources may provide links and/or URLs from which a client may obtain streaming media content and/or segments, links to other unauthorized third-party streaming platforms and/or resources, links to media servers and/or web servers, or other secondhand resources through which a client may obtain or otherwise view the live media stream.

In various embodiments, however, the harvester 115 may keep a record of identified third-party streaming platforms 135 and forward them to a downloader 115. The downloader 115, like the harvester 110, may be implemented in hardware, software, or both hardware and software. In some embodiments, the downloader 115 may include a software agent executable on one or more computer systems, such as a server computer. In some further embodiments, the downloader 115 may be implemented on, without limitation, one or more desktop computer systems, server computers, dedicated custom hardware appliances, PLCs, single board computers, FPGAs, ASICs, or SoCs.

In various embodiments, the downloader 115 may be configured to capture, download, and/or store streaming media content from each of the identified third-party streaming platforms 135. This may include, as previously described, live streaming media segments. In some embodiments, the downloader 115 may be configured to store the captured streaming media content at the stream capture database 140. In some embodiments, the downloader 115 may be configured to receive, from the harvester 110, for example, a URL to one or more third-party streaming platforms 135(a)-135(n) identified as hosting an unauthorized live media stream. The downloader 115 may, for each of the one or more third-party stream platforms 135(a)-135(n), identify one or more streaming resources hosted on the third-party streaming platform 135(a)-135(n). For example, identifying one or more streaming resources may include, without limitation, identifying one or more URLs to streaming media content (including one or more streaming media segment(s)), and/or one or more URLs to a media server from which streaming media content and/or streaming media segments may be obtained. For example, in some embodiments, the downloader 115 may be configured to obtain, from a respective manifest file of each of the third-party streaming platforms 135(a)-135(n), the various streaming resources hosted by or made available on a respective third-party streaming platform 135(a)-135(n). For example, the manifest file may include any URLs from which streaming media content may be obtained by a client device, such as the downloader 115. In further embodiments, the downloader 115 may be configured to extract and analyze website code such as, without limitation, the HTML code of a respective third-party streaming platform 135(a)-135(n) for streaming media content, including links (e.g., URLs) to streaming media content as previously described. In yet further embodiments, the streaming media content may be made directly available for download on a third-party streaming platform 135(a)-135(n) and may be downloaded directly from the third-party streaming platform 135(a)-135(n) by the downloader 115.

Once the one or more streaming resources have been identified, the downloader 115 may then proceed to capture and/or store the streaming media content and/or streaming media segments from the one or more streaming resources. The captured streaming media content may be stored, for example, at the stream capture database 140, and may be made available to the fingerprinter 105 for fingerprinting. Alternatively, in some embodiments, the harvester 110 may directly capture and/or store the streaming media content (e.g., live streaming media segments) at the stream capture database 140, and the downloader 115 and associated features of the downloader 115 may be implemented, at least in part, by the harvester 110.

In various embodiments, like the harvester 110 and downloader 115, the fingerprinter 105 may be implemented in hardware, software, or both hardware and software. In some embodiments, the fingerprinter 105 may include a software agent executable on one or more computer systems, such as a server computer. In some further embodiments, the fingerprinter 105 may be implemented on, without limitation, one or more desktop computer systems, server computers, dedicated custom hardware appliances, PLCs, single board computers, FPGAs, ASICs, or SoCs.

In various embodiments, the fingerprinter 105 may be configured to obtain streaming media content, such as, without limitation, one or more streaming media segments, from the stream capture database 140. The fingerprinter 105 may, then, generate fingerprints from each of the streaming media segments. As will be described in greater detail below with respect to FIG. 2, the each of the streaming media content stored at the stream capture database 140 may include various types of stream segments. In some embodiments, for example, the stream capture database 140 may be configured to store captured streaming media segments for, without limitation, video (e.g., video segments), audio (e.g., audio segments), text (e.g., text data for corresponding video and/or audio segments), and other metadata (e.g., metadata for corresponding media content, or specific video and/or audio segments).

In some embodiments, video, audio, text, and metadata for media content may be extracted from a combined media content file. For example, a combined media content file, such as a combined streaming media segment, may include combined video, audio, text, and/or metadata. Accordingly, the fingerprinter 105, in some embodiments, may be configured to extract video data, audio data, text, and/or metadata from the combined streaming media segment obtained from a stream capture database 140. In some embodiments, the harvester 110 and/or downloader 115 may be configured to extract video data, audio data, text, and/or metadata from a combined streaming media segment to be stored at the stream capture database 140 as separate video and audio stream segments, and text and/or metadata. In yet further embodiments, the third-party streaming platform 135(*a*)-135(*n*) may provide streaming media content that are already separated between video segments, audio segments, text, and metadata. For example, a third-party streaming platform 135(*a*)-135(*n*) may include various types of video segments based on a stream quality desired. For example, for a given timeframe or length of time of video content, one or more video segments at one or more bitrates may be provided. Similarly, audio content for the given timeframe may also be provided as one or more audio segments at one or more bitrates. Accordingly, a respective third-party streaming platform may already host or otherwise provide separate video and audio stream segments, and also associated text and/or metadata.

Accordingly, in various embodiments, the fingerprinter 105 may be configured to obtain, from the stream capture database 140, one or more streaming media segments, including, without limitation, combined streaming media segments, video segments, audio segments, text, and/or metadata. Thus, in various embodiments, once the one or more streaming media segments have been obtained, the fingerprinter 105 may be configured to generate a respective fingerprint for each streaming media segment. For example, in some embodiments, a respective fingerprint may be generated for each combined streaming media segment, video segment, audio segment, text, and/or metadata. In some embodiments, each fingerprint may be uniquely associated with a respective streaming media segment. Various fingerprinting techniques and algorithms, as known to those skilled in the art, may be utilized by the fingerprinter 105 to generate a fingerprint for each streaming media segment. For example, fingerprinting techniques may include, without limitation, digital video fingerprinting, audio fingerprinting (e.g., acoustic fingerprinting), and/or data fingerprinting. Accordingly, in some embodiments, audio and video fingerprinting may relate to fingerprinting of the visual information and audio signal of a respective video segment, audio segment, or a combined streaming media segment with both video and audio data. In some further embodiments, each streaming media segment, including video segments, audio segments, text, and metadata, may be fingerprinted as digital data files utilizing data fingerprinting algorithms, as appropriate. For example, an unauthorized stream that is streamed on a third-party platform 135 but utilizes a re-encoded, recorded, or otherwise altered version of the source stream may be more accurately identified using digital video fingerprinting and audio fingerprinting. In contrast, an unauthorized stream in which links to the source stream are provided may rely on providing the same source digital files (e.g., streaming media segments). In such examples, data fingerprinting may be more accurate at identifying identical streaming media segment files. Accordingly, the fingeprinter 105 may be configured to generate fingerprints using one or more of the aforementioned fingerprinting techniques.

In various embodiments, the fingerprinter 105 may further be supplied with an original version of the streaming media content and/or segments from an authorized source. In various examples, the original version of streaming media content and/or streaming media segments may be referred to as a source streaming media content and/or source streaming media segments. In some embodiments, the fingerprinter 105 may be configured to receive source streaming media content from a source streaming platform 130. The source streaming platform 130 may, accordingly, one or more source streaming resources from which the source streaming media content may be obtained, including, without limitation, one or more URLs from which source streaming media content may be obtained. In some embodiments, the source streaming platform 130 may itself be the source for streaming media content, such as a media server or database on which streaming media content (e.g., one or more streaming media segments) may be made available.

Accordingly, in further embodiments, the fingerprinter 105 may be configured to generate a fingerprint for the source streaming media content. For example, the fingerprinter 105 may generate a fingerprint for each source streaming media segment as it becomes available. In one example, for a live media stream, one or more streaming media segments may be created and made available for viewing via the source streaming platform 130, and additional source streaming media segments may be pushed, or otherwise made available, via the source streaming platform 130 as they become available (e.g., recorded, and encoded) by the source streaming platform 130. Thus, the fingerprinter 105 may be configured to fingerprint each of the source streaming media segments of the source media content.

In various embodiments, the fingerprinter 105 may further be configured to store fingerprints at a fingerprint database 145. For example, in some embodiments, the fingerprinter 105 may be configured to store the generated fingerprints, including fingerprints of streaming media segments obtained from each of the source streaming platform 130 and third-party streaming platforms 135, at the fingerprint database 145 for later access by the analyzer 120. Accordingly, the analyzer 120 may be configured to obtain fingerprints from the fingerprint database 145. Like the fingerprinter 105, harvester 110, and downloader 115, the analyzer 120 may be implemented in hardware, software, or both hardware and software. In some embodiments, the analyzer 120 may include a software agent executable on one or more computer systems, such as a server computer. In some further embodiments, the analyzer 120 may be implemented on, without limitation, one or more desktop computer systems, server computers, dedicated custom hardware appliances, PLCs, single board computers, FPGAs, ASICs, or SoCs.

In various embodiments, the analyzer 120 may be configured to compare fingerprints obtained from the fingerprint database 145. For example, in some embodiments, the analyzer 120 may be configured to compare a fingerprint of a source streaming media segment (e.g., a "source fingerprint"), with a fingerprint of a corresponding streaming media segment obtained from a respective third-party streaming platform 135. In some embodiments, the fingerprints may be a digital data fingerprint. Accordingly, in embodiments where the third-party streaming platform 135(a)-135(n) hosts or otherwise makes available a streaming resource that is identical to the source streaming platform 130 (e.g., the same URL to an identical streaming media segment), the analyzer 120 may be able to detect identical data fingerprints. In some embodiments, the identical data fingerprints may be uniquely associated with a respective streaming media segment, which may in turn be associated with a respective third-party streaming platform. Thus, the analyzer 120 may be configured to determine matching streaming media segments (e.g., fingerprint matches with a source fingerprint), and identify the respective third-party streaming platform 135(a)-135(n) associated with the matching streaming media segment.

In further embodiments, the analyzer 120 may be configured to compare digital video and/or audio fingerprints. Accordingly, the fingerprints may be compared, by the analyzer 120, for a similarity of their visual and/or acoustic content. For example, in some embodiments, digital video fingerprints may be indicative of visual content contained in the digital file (e.g., streaming media segment). In some example, digital video fingerprints may be indicative of visual content contained within one or more frames of the digital video file (e.g., streaming media segment). In some embodiments, the digital video fingerprints may further be related to the visual and spatial characteristics of one or more frames of the digital video file (e.g., streaming media segment). In yet further embodiments, digital video fingerprints may be associated to one or more partial frames (e.g., a bottom half, one or more quadrants of a frame, etc.). Similarly, audio fingerprints may be indicative of the spectral acoustic characteristics of a streaming media segment. Accordingly, similarity between fingerprints may be indicative of similarity between visual and audio content of a file (e.g., streaming media segment), respectively. For example, in some embodiments, the analyzer 120 may be configured to determine a similarity value between two fingerprints for two respective streaming media segments. Accordingly, in some examples, segments having fingerprints with a similarity value above a threshold similarity value may be considered to have matching fingerprints, and thus, identified as containing similar and/or matching visual and/or acoustic content.

In various embodiments, the fingerprinter 105, harvester 110, downloader 115, analyzer 120, or any combination of the above components may be implemented as part of the same device or as separate devices. Moreover, in various embodiments, one or more of the fingerprinter 105, harvester 110, downloader 115, analyzer 120 may be implemented as a centralized system or across multiple machines in a distributed architecture.

Accordingly, in various embodiments, the system 100 may be configured to "harvest" one or more third-party streaming platforms 135 concurrently with the streaming of a live media stream on the source streaming platform 130. As one or more third-party streaming platforms 135(a)-135(n), are identified by the harvester 110, a downloader 115 may further be configured to capture and/or store streaming media content (e.g., streaming media segments) from the one or more third-party streaming platforms 135(a)-135(n) as they become available on each of the respective third-party streaming platforms 135(a)-135(n). Accordingly, the downloader 115 may, in some embodiments, be configured to concurrently download respective streaming media segments from each of the third-party streaming platforms 135(a)-135(n).

Similarly, the fingerprinter 105 may be configured to generate fingerprints for streaming media segments, including the source streaming media segment from the source streaming platform 130, and any other streaming media segments (e.g., from third-party streaming platforms 135) at the stream capture database 140, as they become available. Moreover, if more than one streaming media segment becomes available, in some embodiments, the fingerprinter 105 may be configured to generate fingerprints for each of the streaming media segments concurrently (e.g., simultaneously, and in a centralized and/or distributed manner). In further embodiments, the fingerprinter 105 may be configured to generate fingerprints substantially in real-time, as streaming media segments become available on the stream capture database 140 and/or pushed to the fingerprinter 105 (e.g., via the source streaming platform 130).

The analyzer 120, in various embodiments, may be configured to compare respective fingerprints for each of the streaming media segments obtained from the third-party platforms 135 against a respective source fingerprint for a corresponding source streaming media segment. For example, a source fingerprint for a source streaming media segment covering a first range of timestamps (e.g., 0-2 seconds) of the streaming media content may be compared against one or more fingerprints for respective streaming media segments obtained from the third-party streaming platforms 135(a)-135(n) that includes content in the first range of timestamps (e.g., 0-2 seconds, or any range of times within the first range). Alternatively, all streaming media segments made available within a first window of time from when the source streaming media segment is available may be compared to the source fingerprint. For example, if a first source streaming media segment is made available at a first time, all streaming media segments obtained from and/or otherwise made available on the third-party streaming platforms 135 during a given time window (e.g., a first time window) may be compared against the source fingerprint for the first source streaming media segment. In other words, the source fingerprint for the first source streaming media segment may be compared against each of one or more streaming media segments sequentially obtained from each respective third-party streaming platform 135(a)-135(n) (e.g., a first, second, and third streaming media segment from a first third-party streaming platform 135(a) may be available during the first time window, etc.). Accordingly, in various embodiments, the analyzer 120 may be configured to concurrently compare fingerprints for one or more streaming media segments associated with each of the one or more third-party streaming platforms 135(a)-135(n) against each source fingerprint for each respective source streaming media segment. In some further embodiments, the analyzer 120 further may be configured to compare the fingerprints as they become available at the fingerprint database 145. Accordingly, in various embodiments, the stream capture database 140 and fingerprint database 145 may include, without limitation, both relational databases, such as a structured query language (SQL) database and/or non-relational (e.g., NoSQL) databases as known to those in the art.

Figure 2:
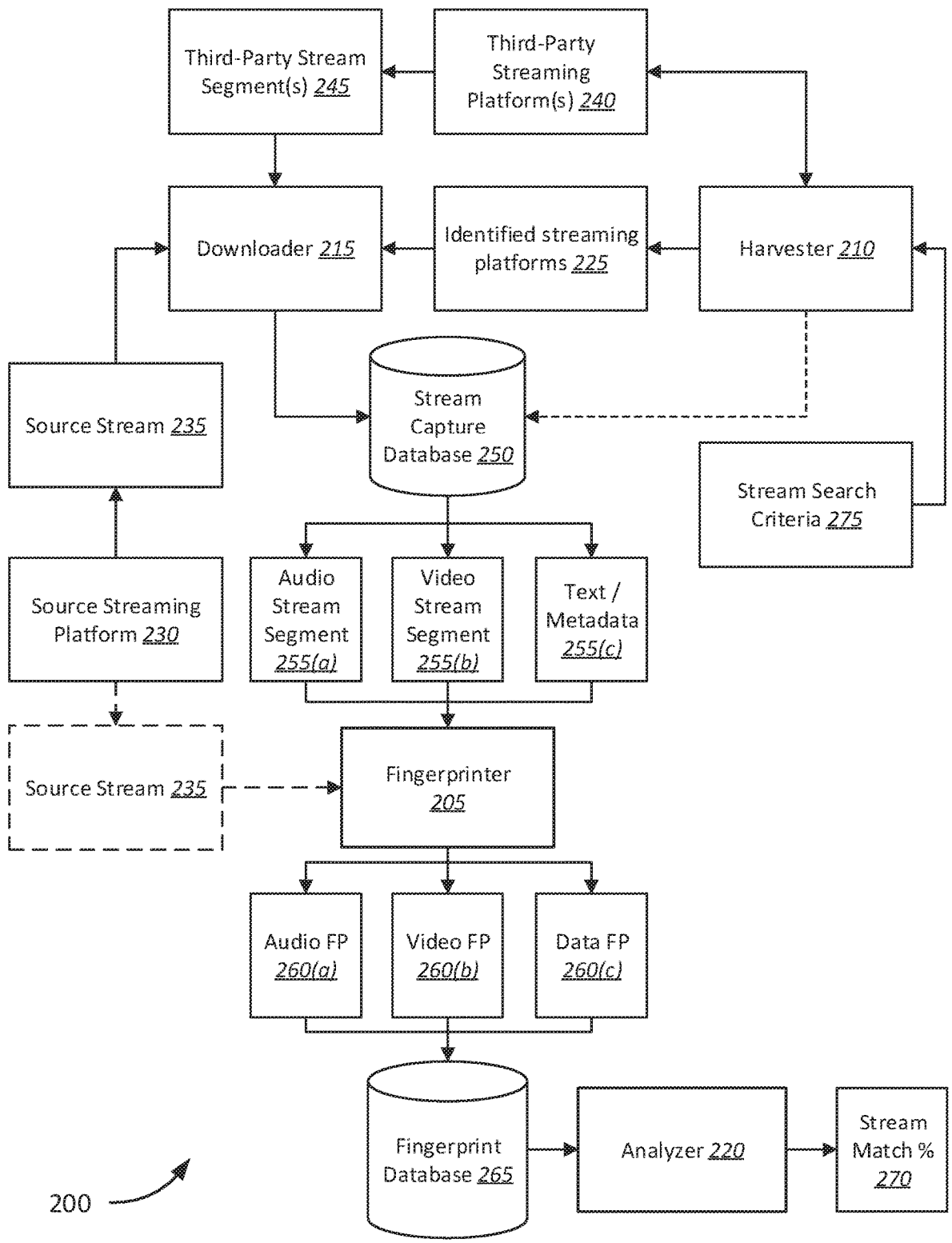
FIG. 2 is a functional block diagram of a fingerprinting system for concurrent media stream aggregate fingerprinting, in accordance with various embodiments.

Several of the techniques and processes described above are illustrated in relation to a functional block diagram of the system 200 in FIG. 2. It should be noted, however, that this system 200 can operate differently in other embodiments (including without limitation those described herein) and in other embodiments, a system different from that depicted by FIG. 2 may be utilized. FIG. 2 is a functional block diagram of a system 200 for concurrent media stream aggregate fingerprinting, in accordance with various embodiments. The system 200 may include a fingerprinter 205, harvester 210, downloader 215, stream analyzer 220, source streaming platform 230, third-party streaming platforms 240, stream capture database 250, and fingerprint database 265. It should be noted that the various components of the system 200 are schematically illustrated in FIG. 2, and that modifications to the system 200 may be possible in accordance with various embodiments.

In various embodiments, as previously described with respect to FIG. 1, the harvester 210 may be coupled to one or more third-party streaming platforms 240, the downloader 215, and the stream capture database 250. The downloader 215 may be coupled to the third-party stream platforms 240, source streaming platform 230, harvester 210, and stream capture database 250. The fingerprinter 205 may be coupled to the source streaming platform 230, stream capture database 250, and fingerprint database 265. The stream analyzer 220 may similarly be coupled to the fingerprint database 265.

As previously described with respect to FIG. 1, the harvester 210 may be configured to receive stream search criteria 275 and identify one or more third-party streaming platforms 240 on which unauthorized streaming media content is hosted or otherwise made available. Stream search criteria 275 may, for example, include a search query or other criteria which may be used to identify the one or more third-party streaming platforms 240. For example, the stream search criteria 275 may include without limitation, keywords, domain names, URLs, known domain masks, internet protocol (IP) addresses, ranges of IP addresses, hardware identifiers (hardware ID) such as hardware addresses and serial numbers, or combinations of hardware addresses and/or serial numbers, and other suitable criteria which may be used to search for and identify the one or more third-party streaming platforms 240. In some embodiments, stream search criteria 275 may be supplied to the harvester 210 manually by a user of the system 200, such as a copyright owner or other user, such as an owner or administrator of the source streaming platform 230. In some further embodiments, the harvester 210 may be configured to identify the search stream criteria 275 automatically, based on information available from the source streaming platform 230, such as information on a webpage (or other resource URL) on which the source stream 235 may be made available.

One or more third-party streaming platforms 240 may, accordingly, be identified by the harvester 210 based on the stream search criteria 275. The harvester 210 may, in some embodiments, be configured to transmit a listing of the identified third-party streaming platforms 225 to the downloader 215. For example, the listing may be a listing of URLs to the third-party streaming platform 240 and/or streaming resources hosted on a third-party streaming platform 240. Accordingly, in some embodiments, the harvester 210 may further be configured to identify links to streaming resources hosted on the identified third-party streaming platform 240. In yet further embodiments, the harvester 210 may be configured to identify links to streaming resources directly based on the stream search criteria 275.

The downloader 215, in various embodiments, may capture one or more third-party stream segments 245 from the third-party streaming platforms 240 identified by the harvester 210. The captured third-party stream segments 245 may then be stored, by the downloader 215, at the stream capture database 250. In further embodiments, the downloader 215 may be configured to further capture the original copies of the source stream 235 via the source streaming platform 230 to be stored in the stream capture database 250, along with any captured third-party stream segments 245. Alternatively, as will be described below, the source streaming platform 230 may be configured to provide a source stream 235 for direct fingerprinting at the fingerprinter 205.

In some embodiments, the downloader 215 may further be configured extract, from a combined streaming media segment, one or more of a video stream segment, audio stream segment, text data and/or other metadata. In some embodiments, the third-party stream segments 245 obtained from the third-party streaming platforms 240 may include separate video and audio stream segments, each of the video stream segments and audio stream segments further including the stream segments of various bitrates and/or alternative digital file formats.

Accordingly, in various embodiments, the fingerprinter 205 may be configured to obtain audio stream segments 255(a), video stream segments 255(b), and text and/or metadata 255(c) from the stream capture database 250. Alternatively, in some embodiments, the fingerprinter 205 may be configured to obtain a combined streaming media segment from the stream capture database 250. The fingerprinter 205 may then extract audio, video, text and/or metadata from the combined streaming media segment. As previously described with respect to FIG. 1, in various embodiments, the fingerprinter 205 may be configured to generate a fingerprint for each respective stream segment obtained form the stream capture database 250, including segments of the source stream 235, and third-party streaming segments 245 captured by the downloader 215. The fingerprinter 205 may be configured to generate an audio fingerprint 260(a), video fingerprint 260(b), and/or a data fingerprint 260(c). In some embodiments, the audio fingerprint 260(a) and video fingerprint 260(b) may be a fingerprint indicative of the characteristics of the acoustic content and/or visual content of respective audio and video stream segments 255(a), 255(b). In other embodiments, the fingerprinter 205 may be configured to generate a data fingerprint 260(c) for one or more of the audio stream segment 255(a), video stream segment 255(b), text and/or metadata 255(c), or combined streaming media segments. As will be apparent to those skilled in the art, the data fingerprint 260(c) may be a fingerprint characterizing the file itself as opposed to the acoustic and/or visual content of a file.

As described above, in some further embodiments, the fingerprinter 205 may be configured to fingerprint a source stream 235 from the source streaming platform. The source stream 235 may be an original, authorized version of the streaming media content available on the source streaming platform 230. The source stream 235 may include a combined streaming media segment and/or separate audio and video stream segments, and text and/or metadata, as previously described. The fingerprinter 205 may similarly generate one or more of audio, video, or data fingerprints 260(*a*)-260(*c*) for each of the source streaming segments of the source stream 235.

In various embodiments, the fingerprinter 205 may be configured to transmit the one or more audio fingerprints 260(*a*), video fingerprints 260(*b*), and data fingerprints 260 (*c*) to the fingerprint database 265. Accordingly, in various embodiments, the stream analyzer 220 may be configured to obtain one or more fingerprints for comparison. For example, each source fingerprint for each source streaming media segment may respectively be compared against audio, video, and data fingerprints 260(*a*)-260(*c*) of streaming segments obtained from third-party streaming platforms 240, as previously described with respect to FIG. 1. Accordingly, for each source fingerprint and third-party fingerprint pairing that is compared, the stream analyzer 220 may be configured to generate a stream match % 270. As previously described, the stream match % 270 may include a similarity value between two fingerprints for two respective streaming media segments. The similarity value may be a numerical value indicative of a similarity between audio and/or video fingerprints, and may further indicate similarity of the acoustic and/or visual content of the streaming media segments. In some embodiments, a similarity value between audio fingerprints, for example, may indicate spectral acoustic similarity between respective audio stream segments, such as a correlation of frequency and amplitude information over time. Similarity values between video fingerprints may, correspondingly, indicate spectral and spatial similarity between various video frames (e.g., images), such as a correlation of spectral and spatial information within respective video streams over time. Similarity values for data fingerprints may in some embodiments, depending on the algorithm used, identify exact fingerprint matches, or like audio and video fingerprints, express a numerical value that is indicative of a level similarity between digital files. Accordingly, in one example, the similarity value may be normalized on a scale 0-1, with a value of 0 being indicative of a 0% match and 1 being indicative of a 100% match between fingerprints. Accordingly, in some examples, segments having fingerprints with a similarity value above a threshold similarity value may be considered to have matching fingerprints, and thus, identified as containing similar and/or matching visual and/or acoustic content.

In further embodiments, the stream match % 270 may indicate a confidence level of a matching stream segments, and may be based on similarity values between fingerprints. Similarity values above a certain threshold, for example 0.25 indicating a 25% match between fingerprints, may be given a stream match % 270 corresponding to a 50% in a streaming segment match. In yet further embodiments, threshold ranges for similarity values may correspond to differing confidence levels. For example, stream segments with a similarity value between 0.25 and 0.5 may correspond to a 50% confidence of matching stream segments, whereas streaming segments with a similarity value over 0.5 to 0.75 may correspond to a 75% confidence of matching stream segments, and similarity values over 0.75 may correspond to a 99% confidence of matching stream segments. In some further embodiments, a stream match % 270 may further be configured to be a function of the number of stream segments with similarity values above a threshold and/or threshold range (e.g., 1 streaming media segment vs. 5 streaming media segments). For example, as more streaming media segments have similarity values above a threshold and/or threshold range, the analyzer 220 may generate a higher stream match % 270.

In various embodiments, when the analyzer 220 determines a similarity value and/or a stream match % 270 indicative of matching stream segments, the analyzer 220 may further perform one or more remedial actions. Remedial actions may include, without limitation, generating and/or transmitting a notification to be sent to a user and/or the copyright owner of the source stream 235. In further embodiments, the harvester 210 may further be configured to identify contact information for domain owners and/or takedown requests for each of the respective third-party streaming platforms 240. Accordingly, the analyzer 220 and/or harvester 210, in some embodiments, may be configured to generate a takedown request and transmit the takedown request to the appropriate parties associated with the respective third-party streaming platforms 240.

Figure 3A:
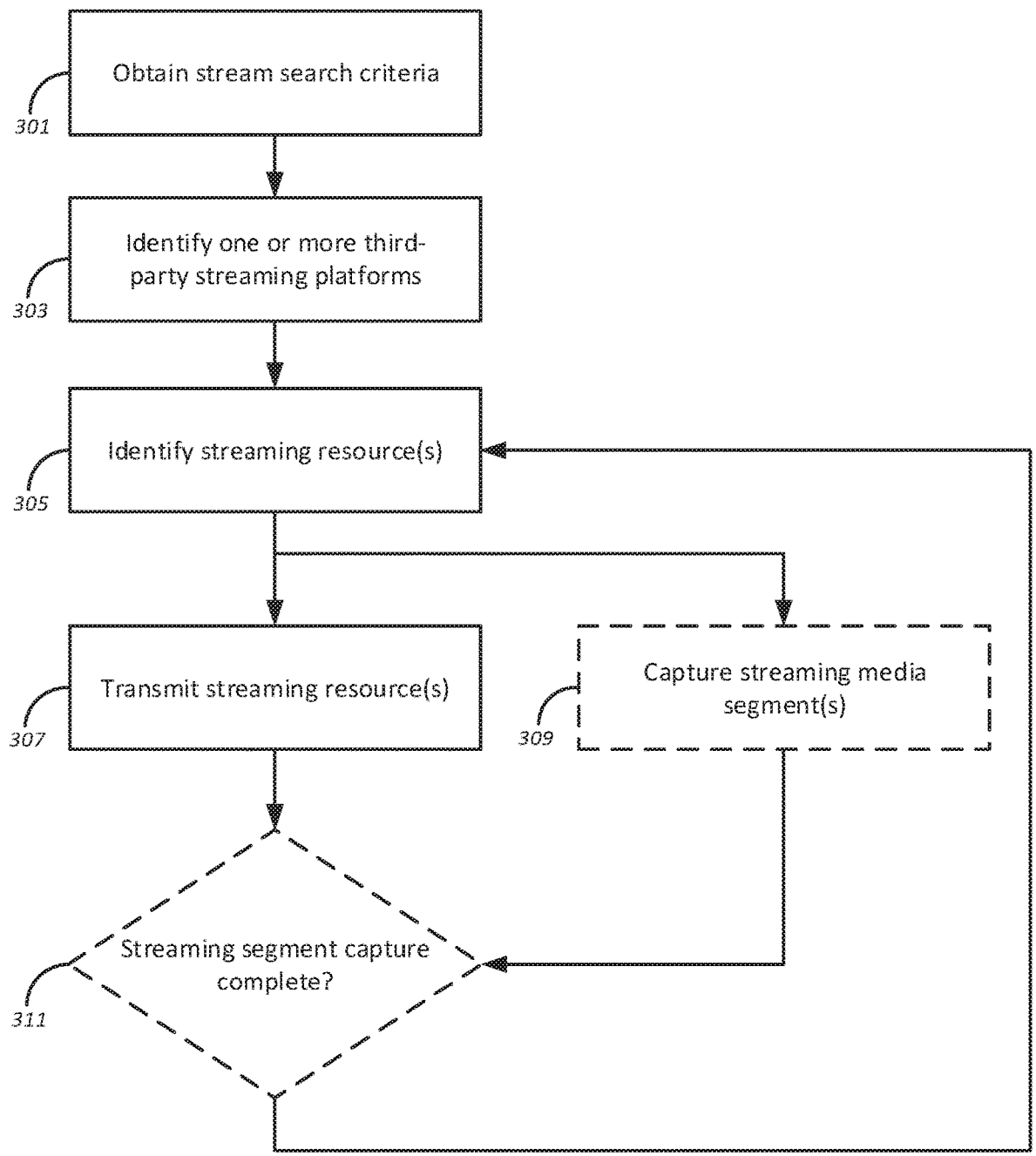
FIG. 3A is a flow diagram of a method of harvesting concurrent media streams, in accordance with various embodiments.
Figure 3B:
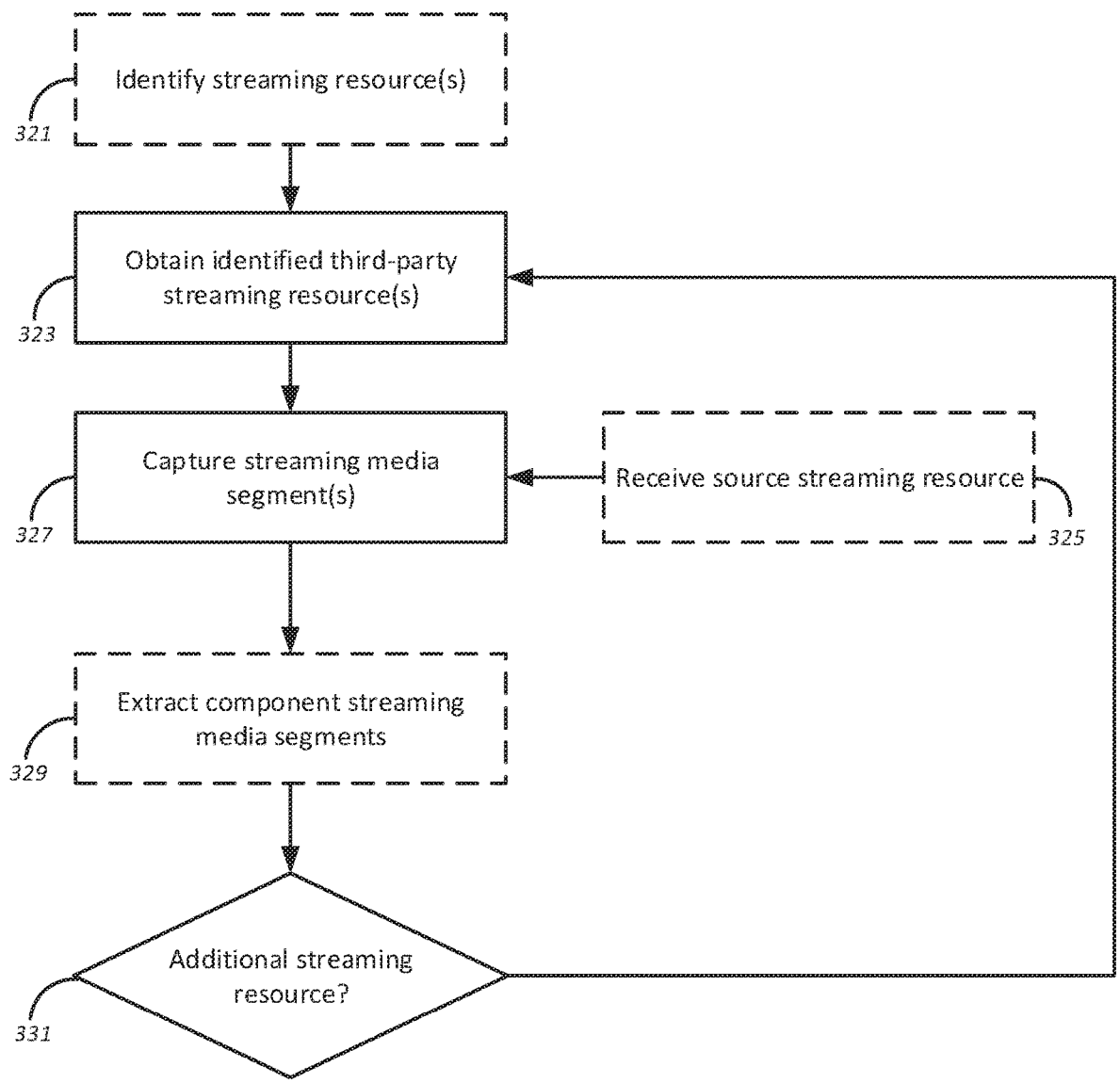
FIG. 3B is a flow diagram of a method for capturing harvested concurrent media streams, in accordance with various embodiments.
Figure 3C:
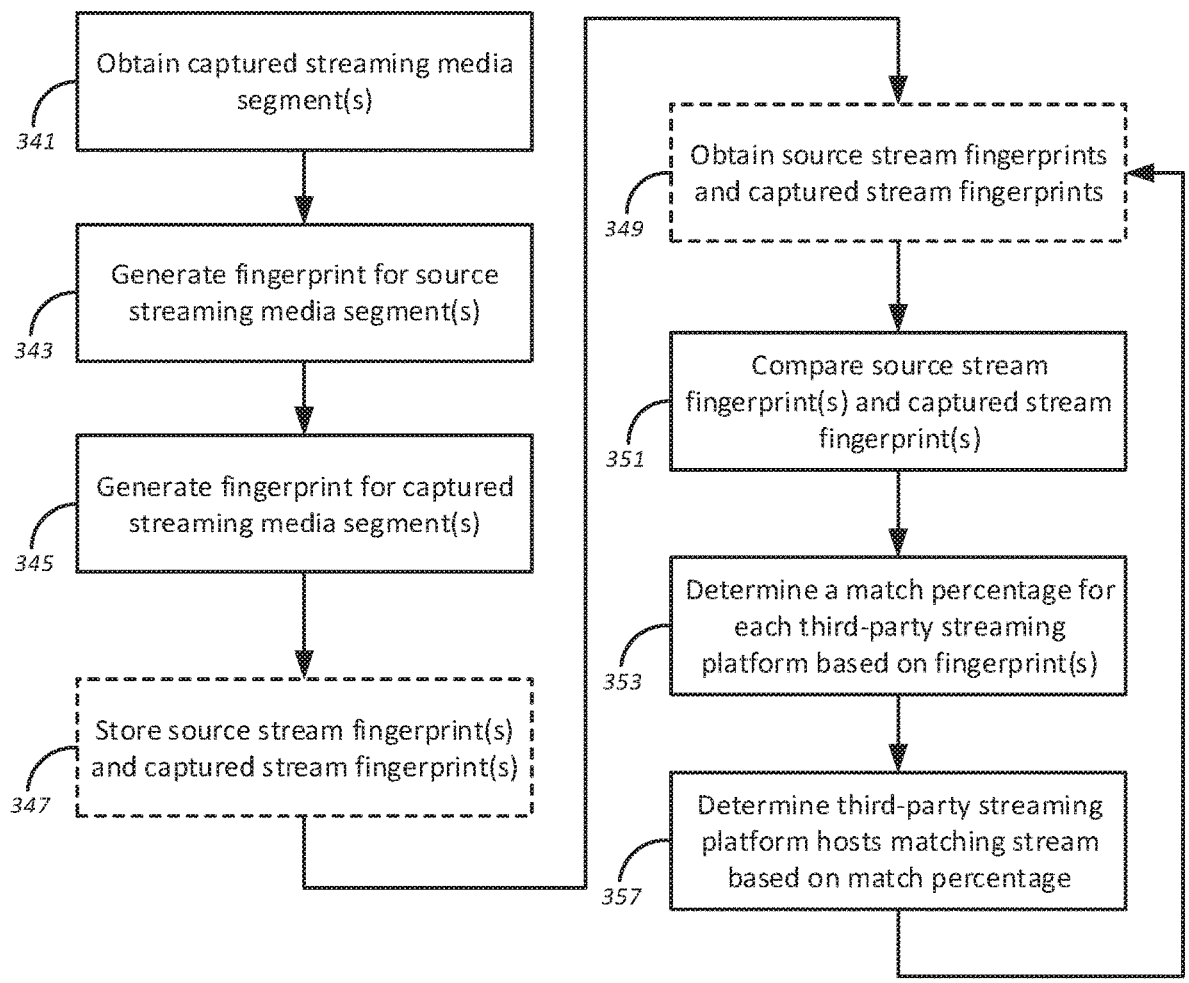
FIG. 3C is a flow diagram of a method for generating fingerprints for each of the captured concurrent media streams, in accordance with various embodiments.

FIGS. 3A-3C illustrate flow diagrams of the various processes described above with respect to FIGS. 1 & 2. While in various embodiments, processes may be described in a certain order for purposes of illustration, it should be appreciated that certain processes may be reordered and/or omitted within the scope of various embodiments. Moreover, while the methods described can be implemented by (and, in some cases, were described with respect to) the system 100 and system 200 of FIGS. 1 & 2 (or components thereof), these methods may also be implemented using any suitable hardware implementation. Similarly, while the system 100 and system 200 of FIGS. 1 & 2 (and/or components thereof) can operate according to the methods described, the systems 100, 200 may also operate according to other modes of operation and/or perform other suitable procedures.

FIG. 3A is a flow diagram of a method 300A of harvesting concurrent media streams, in accordance with various embodiments. The method 300A begins, at block 305, by obtaining, at the harvester, stream search criteria. As previously described, stream search criteria may be provided to the harvester manually or obtained automatically by the harvester based on a source streaming platform. The stream search criteria may include, without limitation, keywords, domain names, URLs, known domain masks, IP addresses, ranges of IP addresses, hardware IDs, and other suitable criteria which may be used to search for and identify third-party streaming platforms which may be hosting an unauthorized stream.

At block 303, the method 300A continues by identifying, via the harvester, one or more third-party streaming platforms hosting an unauthorized stream. In various embodiments, one or more third-party streaming platforms may be identified based on the stream search criteria. In some embodiments, third-party streaming platforms may be identified by the harvester based on the presence of keywords on a respective third-party streaming platform (e.g., a website). For example, as previously described, a website may be analyzed, by the harvester, for the presence of keywords, such as team names, dates, locations, scores, player names, actor names, presenter names, titles, director names, plot synopses, etc. The presence of one or more keywords and/or stream search criteria on a third-party streaming platform may cause the harvester to flag and/or save information regarding the third-party streaming platform (e.g., a URL of the third-party streaming platform).

At block 305, a link to a streaming resource is identified by the harvester. For example, in some embodiments, once the one or more third-party streaming platforms have been identified, the harvester may be configured to further identify one or more streaming resources hosted on the one or more third-party streaming platforms. As previously described, the one or more streaming resources may include, without limitation, media content itself or links to media content. For example, streaming resources may include the streaming media content itself, such as one more streaming media segments, a media file, or a streaming media object (e.g., a javascript or web object to which media content may be pushed), streaming media buffers. Alternatively, streaming resources may provide links and/or URLs from which a client may obtain streaming media content and/or segments, links to other unauthorized third-party streaming platforms and/or resources, links to media servers and/or web servers, or other secondhand resources through which a client may obtain or otherwise view the live media stream. In some embodiments, the harvester may be configured to examine a manifest file associated with a specific webpage of the third-party streaming platform and identify one or more streaming resources listed in the manifest file. In further embodiments, the harvester may be configured to extract and analyze website code such as, without limitation, the HTML code of a respective third-party streaming platform for streaming media content, including links (e.g., URLs) to streaming media content as previously described.

At block 307, the harvester may then transmit a link (e.g., a URL or other network address) to the identified streaming resources to a downloader. In some embodiments, a respective manifest file (containing one or more identified streaming resources) for one or more of the identified one or more third-party streaming platforms may be transmitted to a downloader. At optional block 309, the harvester may itself capture one or more streaming media segments. As previously described, in some embodiments, the harvester itself may include a downloader, or perform at least part of the functions of a downloader.

At optional decision block 311, it may be determined whether the streaming media segment capture has been completed. In various embodiments, the harvester may be configured to determine when a download of the streaming media segment has been completed. If it is determined that the download is completed, the method 300A may return to block 305, to identify a link to a subsequent streaming resource (such as a URL to a streaming media segment). In some embodiments, streaming resources may continuously be updated at the third-party streaming platform. For example, new streaming resources may be pushed to the third-party streaming platform, or new streaming resources may be made available on the third-party streaming platform as they become available. Accordingly, the harvester may check for the availability of new streaming resources.

In some embodiments, the harvester may itself download the streaming media segment, and therefore, may determine that the streaming media segment has completed downloading. In other embodiments, the downloader may indicate to the harvester that a streaming media segment has completed downloading, and consequently trigger the check for the availability of a subsequent streaming resource.

FIG. 3B is a flow diagram of a method 300B for capturing harvested concurrent media streams, in accordance with various embodiments. In some embodiments, the downloader may receive, from the harvester, a list of one or more third-party streaming platforms. The downloader may, thus, at optional block 321, identify one or more streaming resources. The method 300B continues, at block 323, by obtaining, at a downloader, the identified third-party streaming resources. In some embodiments, receiving the identified third-party streaming resources may include receiving URLs or network addresses of one or more streaming resources.

At optional block 325, the downloader may receive a source streaming resource. The downloader may then download and/or capture, at block 327, a source streaming media segment from the source streaming resource. Similarly, at block 327, the downloader may further capture streaming media segments from the identified third-party streaming resources. Capturing streaming media segments from the respective streaming resources may include downloading streaming media segment files, or recording (e.g., screen capture, video capture, audio capture) streaming media content hosted on a third-party streaming platform. The captures streaming media segments may then be stored, via the downloader, at a stream capture database.

The method may continue, at optional block 329, by extracting component streaming media segments from a combined streaming media segment. In some embodiments, the streaming resources may link to a combined streaming media content. Accordingly, in some optional embodiments, the downloader may be configured to separately extract audio streaming media segments, video streaming media segment, text, and/or metadata from the combined streaming media content. In other embodiments, the streaming resources may link directly to separate component streaming media segments (e.g., video segment, audio segment, text data, and/or metadata).

At decision block 331, the downloader may be configured to determine whether there are additional streaming resources available. As previously described, with respect to the method 300A, the downloader may be configured to determine whether a new streaming resource has been made available at a respective third-party streaming resource. Alternatively, the downloader may determine whether another streaming resource has been made available, for example, by being transmitted by the harvester and/or previously obtained by the downloader. Accordingly, if an additional streaming resource is available, the method 300B may return, at block 323, to obtain any newly identified third-party streaming resources, and capture newly available streaming media segments at block 327. Similarly, newly available source stream segments may also be captured.

FIG. 3C is a flow diagram of a method 300C for generating fingerprints for each of the captured concurrent media streams, in accordance with various embodiments. The method 300C begins, at block 341, by obtaining, via a fingerprinter, one or more captured streaming media segments. As previously described, the fingerprinter may be configured to obtain the one or more captured streaming media segments from a stream capture database. In some further embodiments, the fingerprinter may obtain a source streaming segment directly from a source streaming platform (or alternatively a source streaming resource URL).

At block 343, the fingerprinter may generate a respective fingerprint for each of the source streaming media segments. As previously described, the source streaming media segments may include one or more source audio segments, source video segments, source text data and/or other metadata. Furthermore, as previously described, the fingerprinter may generate video fingerprints, audio fingerprints, and/or data fingerprints for each of the source streaming media segments. At block 345, the fingerprinter may similarly generate a respective fingerprint for each of the captured streaming media segments. As with the source streaming media segments, the captured streaming media segments may include one or more audio segments, video segments, text data and/or other metadata. Thus, the fingerprinter may further generate one or more of audio fingerprints, video fingerprints, and/or data fingerprints.

In some further embodiments, the fingerprinter may be configured to obtain a combined streaming media segment, which includes video and audio. Accordingly, in some embodiments, the fingerprinter may extract component streaming media segments (such as a video segment, audio segment, and/or text/metadata). The fingerprinter may then be configured to generate a fingerprint for each of the component streaming media segments, or alternatively, a fingerprint for the combined streaming media segment itself.

At optional block 347, the method 300C may continue by storing the source stream fingerprints and captured stream fingerprints at a fingerprint database. Accordingly, in various embodiments, the fingerprinter may be configured to transmit and store each of the generated fingerprints at the fingerprint database. Accordingly, at optional block 349, an analyzer may be configured to obtain the source stream fingerprints and corresponding captured stream fingerprints from the fingerprint database. As previously described, a source fingerprint for a source streaming media segment covering a first range of timestamps of the streaming media content may be obtained, and a corresponding one or more fingerprints for respective streaming media segments that includes content in the first range of timestamps may also be obtained for comparison. Alternatively, all streaming media segments made available within a first window of time from when the source streaming media segment is available may be obtained by the analyzer for comparison to a source fingerprint.

At block 351, the method 300C may continue, with the analyzer comparing a source fingerprint against one or more captured stream fingerprints. As previously described, a source fingerprint obtained by the analyzer may be compared against one or more fingerprints obtained by the analyzer for respective streaming media segments that includes content in the first range of timestamps, or the respective fingerprints obtained for all the streaming media segments made available within the first window of time as previously described.

At block 353, the analyzer may determine a match percentage for each third party streaming platform based on the fingerprints. As previously described, in some embodiments, the match percentage may be expressed as a similarity value between two fingerprints, where in the similarity value is a numerical value indicative of a similarity of the content of two stream segments. Thus, similarity values within a threshold, or range of thresholds, may correlate to a percentage match between streaming media segments. In some further embodiments, the match percentage may be a confidence level that the streaming media segments are the same or contain the same audio, visual, text, and/or metadata. Thus, the match percentage may, in some embodiments, be a function of one or more similarity values (e.g., threshold similarity values and/or range of threshold values), or a number of stream segments associated with a given third-party streaming platform from which one or more streaming media segments have a respective fingerprint with a similarity value above a threshold (or in a range of threshold values).

Accordingly, at block 357, the method 300C may continue, by determining, with the analyzer, whether a third-party streaming platform hosts a matching stream based on the match percentage. If a third-party streaming platform is determined to be hosting a matching stream, the analyzer may further be configured to perform remedial actions, as previously described. In some further embodiments, if a match percentage or confidence level that a third-party streaming platform has not yet reached a threshold level (or range of threshold values), the method may continue by obtaining, at block 349, a subsequent source stream fingerprints and a subsequent set of fingerprints for captured stream segments, and comparing the source stream fingerprint against the subsequent set of captured stream fingerprints. In this manner, one or more streaming media segments from one or more third-party platforms may be fingerprinted and compared against a live stream, concurrently, and substantially real-time with the live stream, as the one or more streaming media segments become available on each of the respective one or more third-party platforms.

Figure 4:
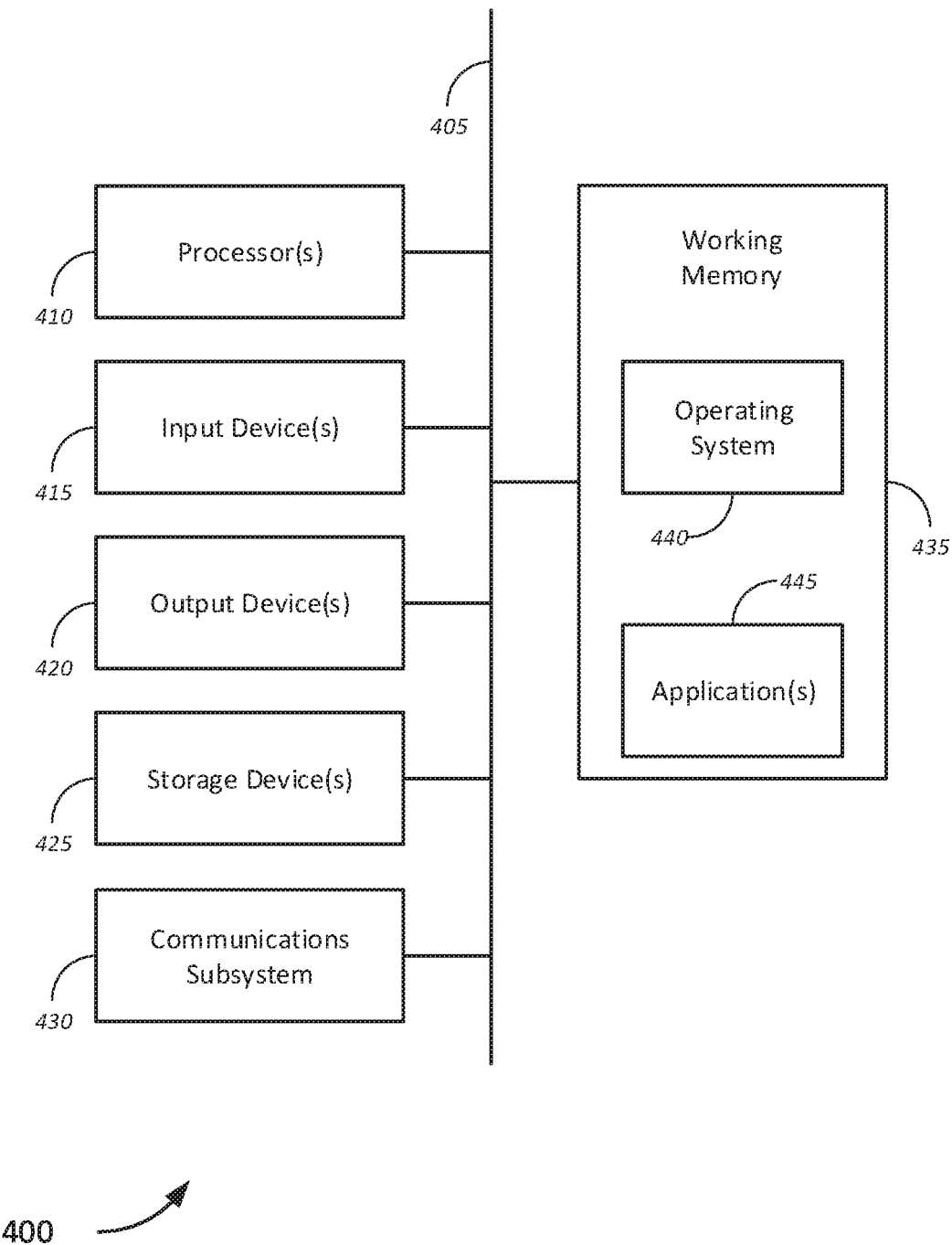
FIG. 4 is a schematic block diagram of a computer system for concurrent media stream aggregate fingerprinting, in accordance with various embodiments.

FIG. 4 is a schematic block diagram of a computer system for concurrent media stream aggregate fingerprinting, in accordance with various embodiments. FIG. 4 provides a schematic illustration of one embodiment of a computer system 400, such as a harvester, downloader, fingerprinter, analyzer, or any combination of these components, which may perform the methods provided by various other embodiments, as described herein. It should be noted that FIG. 4 only provides a generalized illustration of various components, of which one or more of each may be utilized as appropriate. FIG. 4, therefore, broadly illustrates how individual system elements may be implemented in a relatively separated or relatively more integrated manner.

The computer system 400 includes multiple hardware elements that may be electrically coupled via a bus 405 (or may otherwise be in communication, as appropriate). The hardware elements may include one or more processors 410, including, without limitation, one or more general-purpose processors and/or one or more special-purpose processors (such as microprocessors, digital signal processing chips, graphics acceleration processors, and microcontrollers); one or more input devices 415, which include, without limitation, a mouse, a keyboard, one or more sensors, and/or the like; and one or more output devices 420, which can include, without limitation, a display device, and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 400 might also include a communications subsystem 430, which may include, without limitation, a modem, a network card (wireless or wired), an IR communication device, a wireless communication device and/or chip set (such as a Bluetooth™ device, an 802.11 device, a WiFi device, a WiMax device, a WWAN device, a Z-Wave device, a ZigBee device, low-power wireless device, cellular communication facilities, etc.). The communications subsystem 430 may permit data to be exchanged with a network (such as the network described below, to name one example), with other computer or hardware systems, between data centers or different cloud platforms, and/or with any other devices described herein. In many embodiments, the computer system 400 further comprises a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments (including, without limitation, various applications running on the various servers, control units, and various other computer devices as described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, FPGAs, ASICs, and SoCs) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operate in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 425. Volatile media includes, without limitation, dynamic memory, such as the working memory 435. In some alternative embodiments, a computer readable medium may take the form of transmission media, which includes, without limitation, coaxial cables, copper wire and fiber optics, including the wires that comprise the bus 405, as well as the various components of the communication subsystem 430 (and/or the media by which the communications subsystem 430 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals, and/or the like, are all examples of carrier waves on which instructions can be encoded, in accordance with various embodiments of the invention.

The communications subsystem 430 (and/or components thereof) generally receives the signals, and the bus 405 then might carry the signals (and/or the data, instructions, etc. carried by the signals) to the working memory 435, from which the processor(s) 410 retrieves and executes the instructions. The instructions received by the working memory 435 may optionally be stored on a storage device 425 either before or after execution by the processor(s) 410.

Figure 5:
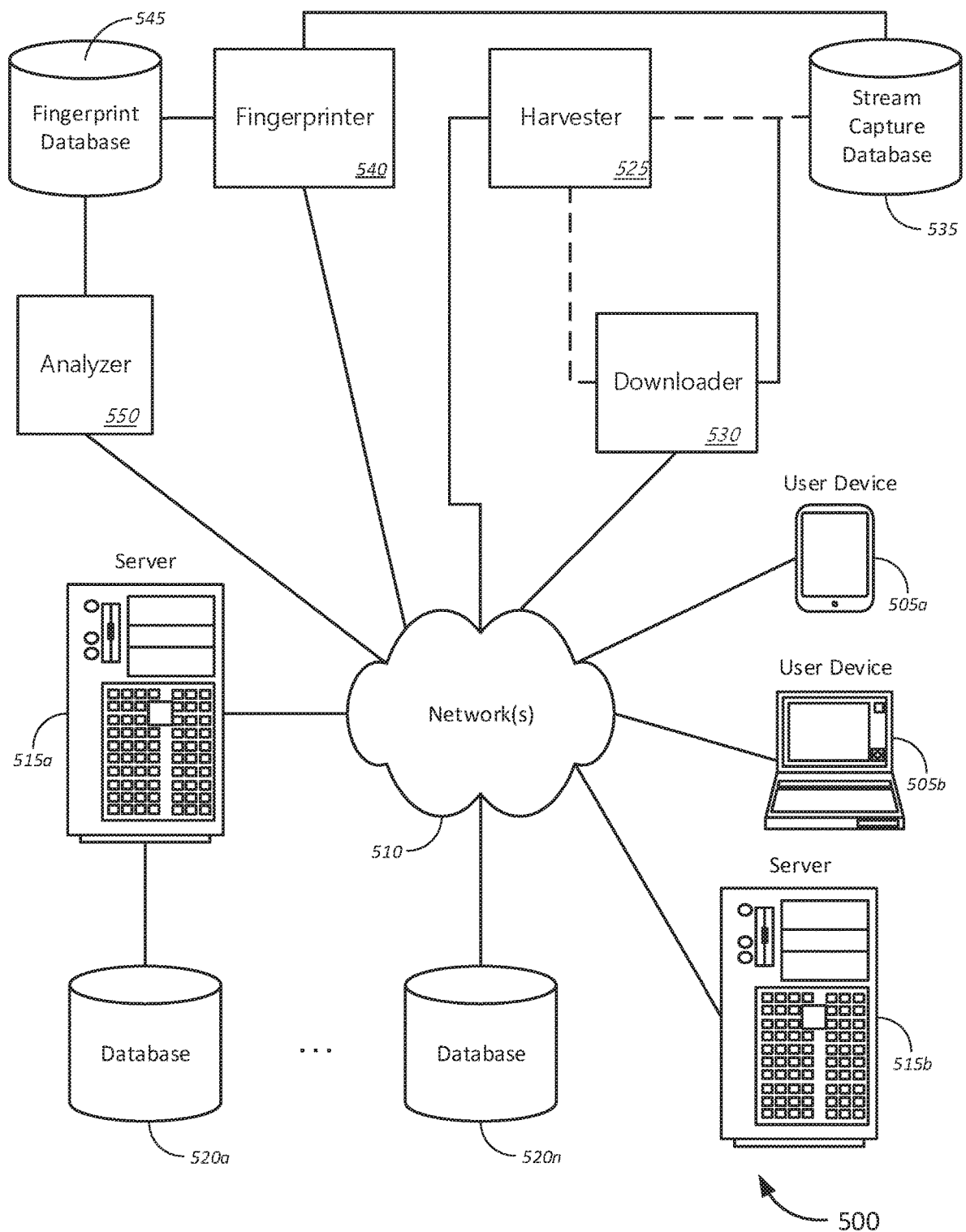
FIG. 5 is a block diagram illustrating a networked system of computing systems, which may be used in accordance with various embodiments.

FIG. 5 is a block diagram illustrating a networked system 500 of computing systems, which may be used in accordance with various embodiments. The system 500 may include one or more user devices 505. A user device 505 may include, merely by way of example, desktop computers, single-board computers, tablet computers, laptop computers, handheld computers, and the like, running an appropriate operating system. User devices 505 may further include external devices, remote devices, servers, and/or workstation computers running any of a variety of operating systems. In some embodiments, the operating systems may include commercially-available UNIX™ or UNIX-like operating systems. A user device 505 may also have any of a variety of applications, including one or more applications configured to perform methods provided by various embodiments, as well as one or more office applications, database client and/or server applications, and/or web browser applications. Alternatively, a user device 505 may include any other electronic device, such as a thin-client computer, Internet-enabled mobile telephone, and/or personal digital assistant, capable of communicating via a network (e.g., the network(s) 510 described below) and/or of displaying and navigating web pages or other types of electronic documents. Although the exemplary system 500 is shown with two user devices 505, any number of user devices 505 may be supported.

Certain embodiments operate in a networked environment, which can include a network(s) 510. The network(s) 510 can be any type of network familiar to those skilled in the art that can support data communications using any of a variety of commercially-available (and/or free or proprietary) protocols, including, without limitation, MQTT, CoAP, AMQP, STOMP, DDS, SCADA, XMPP, custom middleware agents, Modbus, BACnet, NCTIP 1213, Bluetooth, Zigbee/Z-wave, TCP/IP, SNA™, IPX™, AppleTalk™, and the like. Merely by way of example, the network(s) 510 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, management network, and/or the Internet.

Embodiments can also include one or more server computers 515. Each of the server computers 515 may be configured with an operating system, including, without limitation, any of those discussed above, as well as any commercially (or freely) available server operating systems. Each of the servers 515 may also be running one or more applications, which can be configured to provide services to one or more clients 505 and/or other servers 515.

Merely by way of example, one of the servers 515 might be a data server, a web server, a cloud computing device(s), or the like, as described above. The data server might include (or be in communication with) a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of the invention.

The server computers 515, in some embodiments, might include one or more application servers, which can be configured with one or more applications, programs, web-based services, or other network resources accessible by a client. Merely by way of example, the server(s) 515 can be one or more general purpose computers capable of executing programs or scripts in response to the user computers 505 and/or other servers 515, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 505 and/or another server 515. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 505 via a web server (as described above, for example). Similarly, a web server might receive web page requests and/or input data from a user computer 505 and/or forward the web page requests and/or input data to an application server. In some cases, a web server may be integrated with an application server.

In accordance with further embodiments, one or more servers 515 can function as a file server and/or can include one or more of the files (e.g., application code, data files, etc.) necessary to implement various disclosed methods, incorporated by an application running on a user computer 505 and/or another server 515. Alternatively, as those skilled in the art will appreciate, a file server can include all necessary files, allowing such an application to be invoked remotely by a user computer, user device, or customer device 505 and/or server 515.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520a-520n (collectively, "databases 520"). The location of each of the databases 520 is discretionary: merely by way of example, a database 520a might reside on a storage medium local to (and/or resident in) a server 515a (or alternatively, user device 505). Alternatively, a database 520n can be remote from any or all of the computers of system 500 so long as it can be in communication (e.g., via the network 510) with one or more of these. In a particular set of embodiments, a database 520 can reside in a storage-area network ("SAN") familiar to those skilled in the art (Likewise, any necessary files for performing the functions attributed to the computers of the system 500 can be stored locally on the respective computer and/or remotely, as appropriate.) In one set of embodiments, the database 520 may be a relational database configured to host one or more data lakes collected from various data sources, such as the managed object 525, user devices 505, or other sources. Relational databases may include, for example, an Oracle database, that is adapted to store, update, and retrieve data in response to SQL-formatted commands. The database might be controlled and/or maintained by a database server.

The system 500 may further include a harvester 525, downloader 530, stream capture database 535, fingerprinter 540, fingerprint database 545, and analyzer 550. In various embodiments, as previously described, the fingerprinter 540 may be configured to identify one or more third-party streaming platforms on which unauthorized streaming media content may be hosted. In some embodiments, the one or more third-party streaming platforms, and in some examples, a source streaming platform, may be implemented, for example, on one or more of the servers 515. Once identified, the harvester 525 may be configured to indicate to the downloader 530 the identified one or more third-party streaming platforms.

As previously described, the downloader 530 may, in various embodiments, capture streaming media content (e.g., streaming media segments) from the one or more third-party streaming platforms. The downloader 530 may further be configured to store the captured streaming media segments on the stream capture database 535. The fingerprinter 540 may, in various embodiments, be configured to obtain one or more streaming media segments from the stream capture database 535. In further embodiments, the fingerprinter 540 may be configured to obtain a source streaming media segment from a source streaming platform, which may be implemented on one or more of the servers 515. In further embodiments, the stream capture database 535 may include one or more source streaming media segments.

In various embodiments, the fingerprinter 540 may further be configured to generate one or more fingerprints for each of the streaming media segments. The fingerprinter 540 may further be configured to store the one or more fingerprints at the fingerprint database 545. The analyzer 550 may, in various embodiments, be configured to obtain one or more fingerprints from the fingerprint database 545. The analyzer 550, for example, may obtain a source stream fingerprint to be compared against one or more captured stream fingerprints. As previously described, the analyzer 550 may further be configured to determine a match percentage (e.g., a similarity value, matching stream confidence, etc.) between a source stream fingerprint and one or more respective captured stream fingerprints. In yet further embodiments, the analyzer 550 may be configured to perform one or more remedial actions based on the match percentage, as previously described.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
a hardware harvester subsystem configured to identify a first address associated with a first third-party streaming platform based on stream search criteria, the first third-party streaming platform hosting unauthorized streaming media content comprising a plurality of streaming media segments;
a hardware downloader subsystem configured to capture a first streaming media segment of the plurality of streaming media segments of the unauthorized streaming media content from the first address;
a hardware fingerprinter subsystem configured to generate a first captured stream fingerprint corresponding to content of the first streaming media segment captured from the first address, the first captured stream fingerprint uniquely associated with the first streaming media segment, and generate a first source fingerprint corresponding to content of a source streaming media segment;
an analyzer subsystem comprising a processor, and a non-transitory computer readable medium comprising instructions executable by the processor to:
obtain, from the hardware fingerprinter subsystem, the first source fingerprint and first captured stream fingerprint;
determine a first similarity value between the first source fingerprint and the first captured stream fingerprint;
determine, based at least in part on the first similarity value, whether the first third-party streaming platform includes unauthorized streaming media content, wherein the unauthorized streaming media content includes the first streaming media segment, that matches source streaming media content, wherein the source streaming media content includes the source streaming media segment, wherein determining whether the first third-party streaming platform includes unauthorized streaming media content further includes:
  determining a match percentage for the first third-party streaming platform, wherein the match percentage expresses a confidence level of the analyzer that the first third-party streaming platform includes streaming media content that matches the source streaming media content,
  wherein the match percentage is determined as a function of one or more similarity values, including the first similarity value, of one or more respective captured stream fingerprints, including the first captured stream fingerprint, for one or more respective streaming media segments, including the first streaming media segment, associated with the first third-party streaming platform as compared against one or more respective source stream fingerprints of one or more respective source streaming media segments; and
  perform a remedial action based on the determination that the first third-party streaming platform includes unauthorized streaming media content.

2. The system of claim 1, further comprising:
a stream capture database configured to store one or more streaming media segments including the first streaming media segment; and
a fingerprint database configured to store one or more fingerprints generated by the hardware fingerprinter subsystem.

3. The system of claim 1, wherein the instructions are further executable by the processor to:
  determine a first range of timestamps associated with the first source streaming media segment;
  obtain, via the hardware fingerprinter subsystem, a first set of captured stream fingerprints including the first captured stream fingerprint, wherein each of the captured stream fingerprints of the first set of captured stream fingerprints are associated with a respective streaming media segment corresponding to the first range of the first source streaming media segment; and
  generate a respective similarity value for each of the captured stream fingerprints of the first set of captured stream fingerprints.

4. The system of claim 3, wherein the instructions are further executable by the processor to:
  determine a respective third-party platform associated with each of the captured stream fingerprints of the first set captured stream fingerprints,
  wherein the first set of captured stream fingerprints includes a second captured stream fingerprint of a second streaming media segment associated with a second third-party streaming platform.

5. The system of claim 1, wherein the instructions are further executable by the processor to:
  determine whether the first captured stream fingerprint is a video fingerprint or audio fingerprint; and
  responsive to determining that the first captured stream fingerprint is a video fingerprint or audio fingerprint, determining a similarity value indicative of a similarity between video content or audio content of the first streaming media segment and video content or audio content of the source streaming media segment.

6. The system of claim 1, wherein the remedial action includes:
  generating a takedown request; and
  transmitting the takedown request to a party associated with the first third-party streaming platform.

7. The system of claim 1, wherein the hardware fingerprinter subsystem is further configured to:
  determine whether the first streaming media segment is an audio segment or video segment, and
  responsive to determining that the first streaming media segment is an audio segment or video segment, generating, respectively, an audio fingerprint or video fingerprint, wherein the audio fingerprint is based, at least in part, on spectral acoustic characteristics of audio content of the audio segment, and wherein the video fingerprint is based, at least in part, on the spectral characteristics of video content of the video segment.

8. The system of claim 1, wherein the first streaming media segment includes audio content and video content, wherein the hardware fingerprinter subsystem is further configured to:
  extract, from the first streaming media segment, a first audio segment containing the audio content of the first streaming media segment;
  extract, from the first streaming media segment, a first video segment containing the video content of the first streaming media segment; and
  generating a first audio fingerprint for the first audio segment, and a first video fingerprint of the first video segment, wherein the first audio fingerprint is based, at least in part, on spectral acoustic characteristics of the audio content of the first audio segment, and wherein the first video fingerprint is based, at least in part, on the spectral characteristics of video content of the first video segment.

9. An apparatus comprising:
a processor; and
non-transitory computer readable media comprising instructions executable by the processor to:
  obtain, from a fingerprint subsystem, a first source fingerprint corresponding to content of a first source streaming media segment, and a first captured stream fingerprint corresponding to content of a first streaming media segment of a plurality of streaming media segments of unauthorized streaming media content, wherein the first streaming media segment is captured from a first address associated with a first third-party streaming platform;
  determine a first similarity value between the first source fingerprint and the first captured stream fingerprint;
  determine, based at least in part on the first similarity value, whether the first third-party streaming platform includes unauthorized streaming media content, wherein the unauthorized streaming media content includes the first streaming media segment, that matches source streaming media content, wherein the source streaming media content includes the source streaming media segment, wherein determining whether the first third-party streaming platform includes unauthorized streaming media content further includes:
    determining a match percentage for the first third-party streaming platform, wherein the match percentage expresses a confidence level of the analyzer that the first third-party streaming platform includes streaming media content that matches the source streaming media content,
    wherein the match percentage is determined as a function of one or more similarity values, including the first similarity value, of one or more respective captured stream fingerprints, including the first captured stream fingerprint, for one or more respective streaming media segments, including the first streaming media segment, associated with the first third-party streaming platform as compared against one or more respective source stream fingerprints of one or more respective source streaming media segments; and perform a remedial action based on the determination that the first third-party streaming platform includes unauthorized streaming media content.

10. The apparatus of claim 9, wherein the instructions are further executable by the processor to:
determine a first range of timestamps associated with the first source streaming media segment;
obtain, via the fingerprinter subsystem, a first set of captured stream fingerprints including the first captured stream fingerprint, wherein each of the captured stream fingerprints of the first set of captured stream fingerprints are associated with a respective streaming media segment corresponding to the first range of the first source streaming media segment; and
generate a respective similarity value for each of the captured stream fingerprints of the first set of captured stream fingerprints.

11. The apparatus of claim 10, wherein the instructions are further executable by the processor to:
determine a respective third-party platform associated with each of the captured stream fingerprints of the first set captured stream fingerprints,
wherein the first set of captured stream fingerprints includes a second captured stream fingerprint of a second streaming media segment associated with a second third-party streaming platform.

12. The apparatus of claim 9, wherein the instructions are further executable by the processor to:
determine whether the first captured stream fingerprint is a video fingerprint or audio fingerprint; and
responsive to determining that the first captured stream fingerprint is a video fingerprint or audio fingerprint, determining a similarity value indicative of a similarity between video content or audio content of the first streaming media segment and video content or audio content of the source streaming media segment.

13. The apparatus of claim 9, wherein the remedial action includes:
generating a takedown request; and
transmitting the takedown request to a party associated with the first third-party streaming platform.

14. The apparatus of claim 9, wherein the remedial action includes:
identifying a party associated with a source streaming platform; and
alerting the party associated with the source streaming platform to the presence of the unauthorized streaming media content on the first third-party streaming platform.

15. A method comprising:
identifying, via a harvester subsystem, a first address associated with a first third-party streaming platform based on stream search criteria, the first third-party streaming platform hosting unauthorized streaming media content comprising a plurality of streaming media segments;
capturing, via a downloader subsystem, a first streaming media segment of the plurality of streaming media segments of the unauthorized streaming media content from the first address;
generating, via a fingerprinter subsystem, a first captured stream fingerprint corresponding to content of the first streaming media segment captured from the first address, the first captured stream fingerprint uniquely associated with the first streaming media segment;
generating, via the fingerprinter subsystem, a first source fingerprint corresponding to content of a source streaming media segment;
comparing, via an analyzer subsystem, the first source fingerprint and the first captured stream fingerprint;
determining, via the analyzer subsystem, a first similarity value indicative of a similarity between the first source fingerprint and the first captured stream fingerprint, wherein determining whether the first third-party streaming platform includes unauthorized streaming media content further includes:
determining a match percentage for the first third-party streaming platform, wherein the match percentage expresses a confidence level of the analyzer that the first third-party streaming platform includes streaming media content that matches the source streaming media content,
wherein the match percentage is determined as a function of one or more similarity values, including the first similarity value, of one or more respective captured stream fingerprints, including the first captured stream fingerprint, for one or more respective streaming media segments, including the first streaming media segment, associated with the first third-party streaming platform as compared against one or more respective source stream fingerprints of one or more respective source streaming media segments; and
determining, via the analyzer subsystem, based at least in part on the first similarity value, whether the first third-party streaming platform includes unauthorized streaming media content, wherein the unauthorized streaming media content includes the first streaming media segment, that matches source streaming media content, wherein the source streaming media content includes the source streaming media segment.

16. The method of claim 15 further comprising:
performing, via the analyzer subsystem, a remedial action based on the determination that the first third-party streaming platform includes unauthorized streaming media content.

17. The method of claim 15 further comprising:
determining a first range of timestamps associated with the first source streaming media segment;
obtaining, via the analyzer subsystem, a first set of captured stream fingerprints including the first captured stream fingerprint, wherein each of the captured stream fingerprints of the first set of captured stream fingerprints are associated with a respective streaming media segment corresponding to the first range of the first source streaming media segment; and
generating, via the analyzer subsystem, a respective similarity value for each of the captured stream fingerprints of the first set of captured stream fingerprints.

18. The method of claim 17 further comprising:
extracting, via the fingerprinter subsystem, a first audio segment containing audio content of the first streaming media segment from the first streaming media segment, wherein the first streaming media segment includes audio content and video content;

extracting, via the fingerprinter subsystem, from the first streaming media segment, a first video segment containing the video content of the first streaming media segment; and generating, via the fingerprinter subsystem, a first audio fingerprint for the first audio segment, and a first video fingerprint of the first video segment, wherein the first audio fingerprint is based, at least in part, on spectral acoustic characteristics of the audio content of the first audio segment, and wherein the first video fingerprint is based, at least in part, on the spectral characteristics of video content of the first video segment.

* * * * *